US007809387B2

(12) United States Patent
Chaudry et al.

(10) Patent No.: US 7,809,387 B2
(45) Date of Patent: Oct. 5, 2010

(54) METHODS AND APPARATUS FOR PRIORITIZING VOICE CALL REQUESTS DURING DATA COMMUNICATION SESSIONS WITH A MOBILE DEVICE

(75) Inventors: Shahid R. Chaudry, Ottawa (CA); M. Khaledul Islam, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 1166 days.

(21) Appl. No.: 10/667,983

(22) Filed: Sep. 22, 2003

(65) Prior Publication Data

US 2005/0064891 A1    Mar. 24, 2005

(51) Int. Cl.
H04B 7/00    (2006.01)

(52) U.S. Cl. .................. 455/512; 455/509; 455/511; 370/328; 370/329; 709/230; 709/236; 379/201.01; 379/207.02

(58) Field of Classification Search .................. 455/512, 455/527, 509, 511; 370/328, 329; 709/230, 709/236; 379/201.01, 207.02, 279, 355.01
See application file for complete search history.

(56) References Cited

U.S. PATENT DOCUMENTS

| 6,633,765 | B1 * | 10/2003 | Maggenti | 455/503 |
| 6,711,141 | B1 | 3/2004 | Rinne et al. | |
| 7,050,411 | B2 * | 5/2006 | Harris | 370/335 |
| 7,054,323 | B2 | 5/2006 | Viola et al. | |
| 7,272,215 | B2 * | 9/2007 | Bremer et al. | 379/93.09 |
| 7,433,961 | B2 | 10/2008 | Munje et al. | |
| 2002/0087716 | A1 * | 7/2002 | Mustafa | 709/236 |
| 2004/0022209 | A1 * | 2/2004 | Misra et al. | 370/328 |
| 2004/0095903 | A1 * | 5/2004 | Ryan et al. | 370/329 |
| 2004/0125800 | A1 * | 7/2004 | Zellner | 370/389 |

FOREIGN PATENT DOCUMENTS

| WO | 9912380 A1 | 3/1999 |
| WO | 02076025 A1 | 9/2002 |
| WO | 2004059997 A1 | 7/2004 |

OTHER PUBLICATIONS

Canadian Office Action for application No. 2,441,869, dated Aug. 9, 2007.
"3rd Generation partnership project; Technical Specification Group GSM/EDGE Radio Access Network; Mobile radio interface layer 3 Specification; Radio Resource Control (RRC) protocol", 3GPP TS44.018, vol. 6.3.0, pp. 41-82, dated Jul. 2003. (See Section 3.4.25).

* cited by examiner

Primary Examiner—Tuan H Nguyen
(74) Attorney, Agent, or Firm—John J. Oskorep, Esq.

(57) ABSTRACT

Methods and apparatus for prioritizing voice call requests during data communication sessions involving a mobile communication device are disclosed. In one illustrative example, an end user invokes a voice call request though a user interface of the mobile device. If this request is made while the mobile device is engaged in a connected data communication service, the mobile device immediately forces the connected data service into a dormant state. In particular, a release order is transmitted to tear down a traffic channel of the connected data service so that the voice call request can be processed. Subsequently, a voice call with the mobile device is established using a new traffic channel. When the voice call is completed, data communications will resume if needed. Advantageously, the mobile device prioritizes voice calls over data communication sessions which may be deemed less time-critical.

33 Claims, 4 Drawing Sheets

METHODS AND APPARATUS FOR PRIORITIZING VOICE CALL REQUESTS DURING DATA COMMUNICATION SESSIONS WITH A MOBILE DEVICE

BACKGROUND

1. Field of the Invention

The present invention relates generally to mobile communication devices which provide for both voice and data call capabilities, and more particularly to the prioritization of voice call requests during data communication sessions with the mobile device.

2. Description of the Related Art

A mobile communication device, such as a mobile station operating in a wireless communication network, may provide for both voice and data communications for an end user. The mobile device may, for example, be compatible with 3$^{rd}$ Generation (3G) communication standards. Some versions of 3G standards (such as IS-2000 Release 0), however, do not allow for the simultaneous communication of both voice and user data at the mobile device. Such a mobile device is capable of maintaining either a voice call or a data call, but not a voice call and a data call at the same time.

An Internet Protocol (IP) connection may be utilized to communicate packet data to and from the mobile device. To provide packet data connectivity between the mobile device and an IS-2000-compliant network, a Point-to-Point Protocol (PPP) link layer connection is also established between the mobile device and the network. A packet data service is said to be in an "active" state while the PPP connection is established. An "always-on, always-connected" mobile device is supposed to maintain PPP connectivity all of the time and maintain this active state. When the PPP connectivity is terminated, the packet data service is said to be in an "inactive" state.

An active packet data service may be in either a "connected" state or a "dormant" state. A packet data service is said to be "connected" when a traffic channel for a data call is established between the mobile device and the network. In this connected state, data is actively exchanged between the mobile device and the network over the traffic channel or is expected. If no user data is received or transmitted within a predetermined time period (e.g. 10 or 20 seconds), the traffic channel is torn down either by the mobile device or the network. Here, the packet data service is said to enter into the "dormant" state. In the dormant state, the IP connection and the PPP session are still maintained but the physical layer and radio resources are released. If data communications are subsequently resumed, the packet data service will again become "connected" where the traffic channel is reestablished for communicating data.

Traditionally, the operation of this type of mobile device is limited in that the end user cannot initiate a voice call from the mobile device during a data call (i.e. when the packet data service is in the connected state). The mobile device permits the end user to place a voice call only if the packet data service is in the inactive state or the dormant state. If otherwise attempted, the mobile device will not initiate voice call processing. In some cases, the end user is not even aware of the data communication activity and is not alerted to the reason why the voice call could not be placed. A wireless network similarly cannot successfully initiate a voice call to the mobile device when the mobile device is engaged in a data call. If a voice call is attempted to a mobile device which is already engaged in a data call, the network typically provides a busy signal to the caller or sends the call to voicemail of the mobile device. Unfortunately, the user ordinarily has to wait until the expiration of inactivity time (e.g. 10 or 20 seconds of no user data being received or transmitted) until the dormant state is entered in order to place or receive the voice call. As apparent, time-critical voice calls may be undesirably missed during less time-critical data communications.

SUMMARY

Methods and apparatus for prioritizing voice call requests during data communication sessions involving a mobile communication device are described herein. In one illustrative example, an end user invokes a voice call request though a user interface of the mobile device. If this request is made while the mobile device is engaged in a connected data communication service, the mobile device immediately forces the connected data service into a dormant state. In particular, a release order is transmitted to tear down a traffic channel of the connected data service so that the voice call request can be processed. Subsequently, a voice call with the mobile device is established using a new traffic channel. When the voice call is completed, data communications will resume if needed. Advantageously, the mobile device prioritizes voice calls over data calls which may be deemed less time-critical.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for prioritizing voice call requests during data communication sessions involving a mobile communication device are described herein. In one illustrative example, an end user invokes a voice call request at a user interface of the mobile device. If the request is made while the mobile device is engaged in a connected data communication service, the mobile device immediately forces the connected data service into a dormant state. In particular, a release order is transmitted to tear down a traffic channel of the connected data service so that the voice call request can be processed. Subsequently, a voice call with the mobile device is established with a new traffic channel. When the voice call is completed, data communications associated with the data service may resume if needed. Advantageously, the mobile device prioritizes voice calls during data communication sessions which may be deemed less time-critical.

Figure 1:
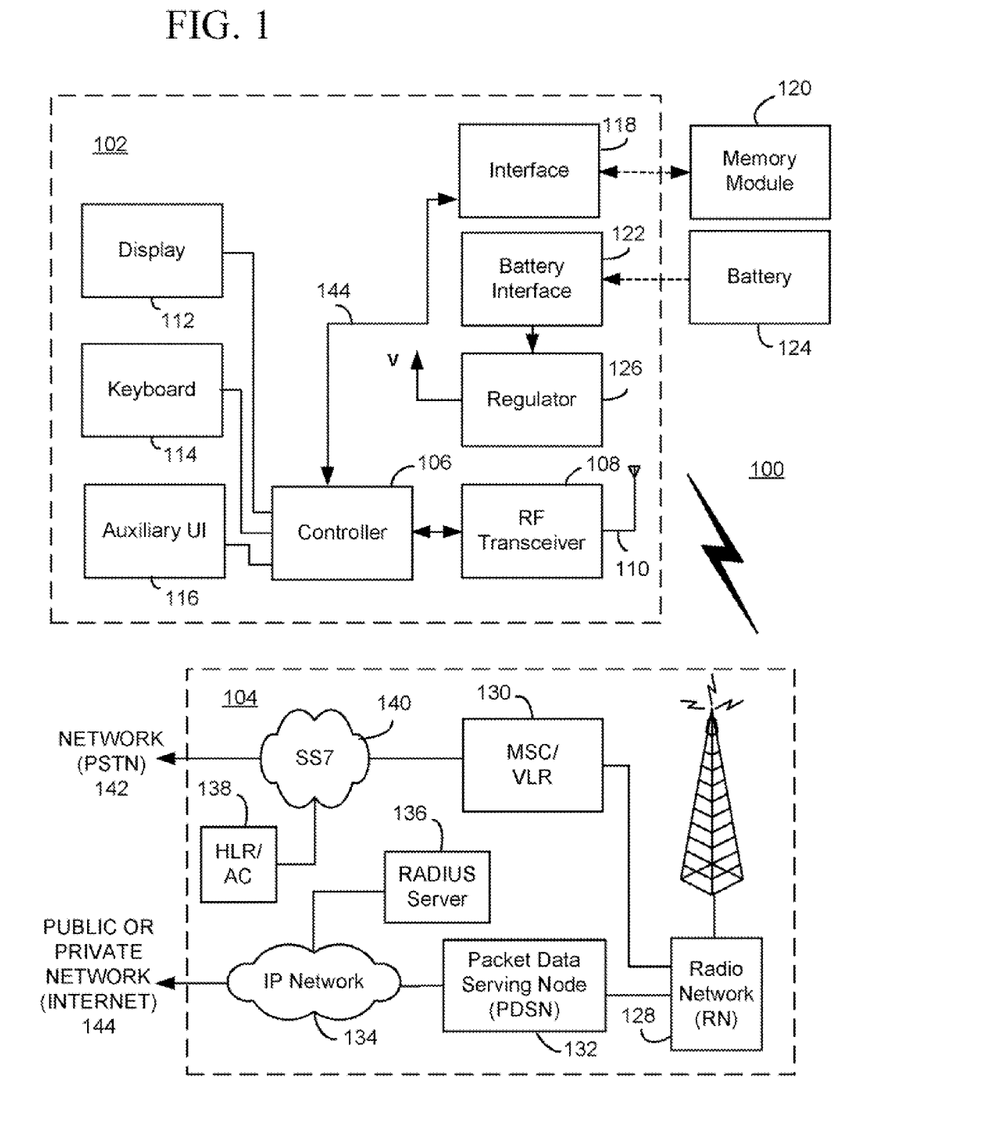
FIG. 1 is a block diagram which illustrates pertinent components of a mobile communication device which communicates within a wireless communication network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
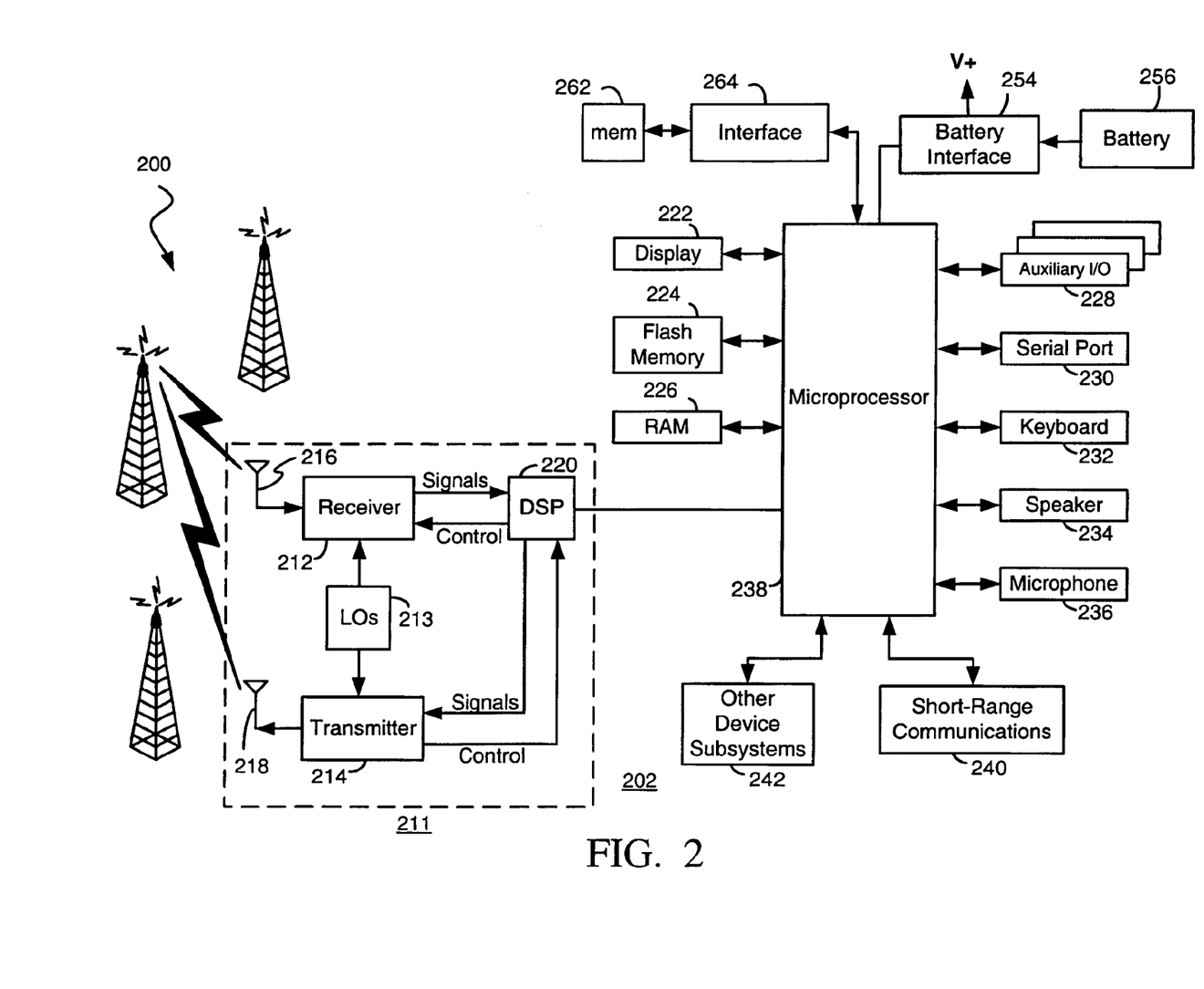
FIG. 2 is a more detailed diagram of a preferred mobile communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
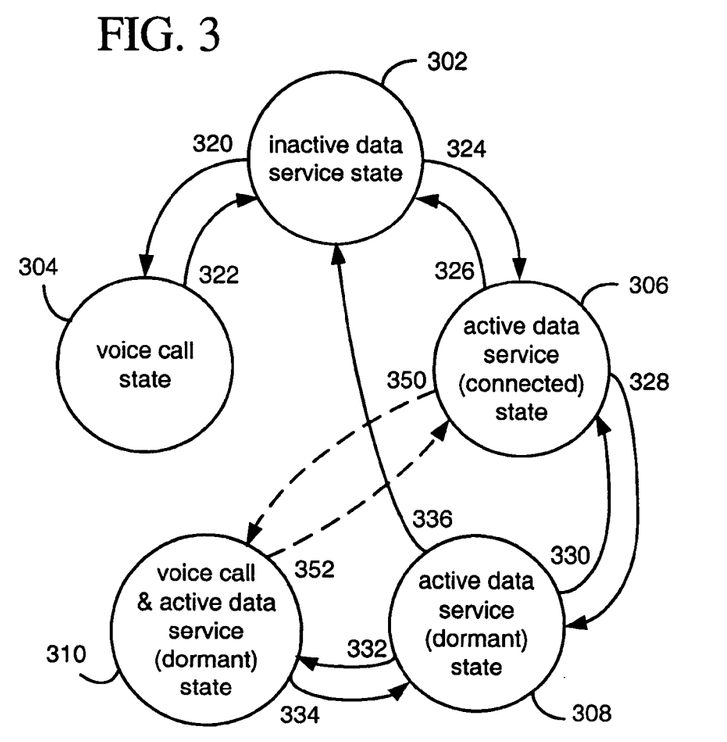
FIG. 3 is a state flow diagram for voice call and data communication session processing for a mobile communication device.

FIG. 3 is a state flow diagram 300 for voice call and data communication session processing for a mobile communication device of the present application (FIGS. 1-2). State flow diagram 300 shows a plurality of different operating states of the mobile communication device, including an inactive data service state 302, a voice call state 304, an active data communication service (connected) state 306, an active data communication service (dormant) state 308, and a voice call & active data communication service (dormant) state 310. Although a limited number of pertinent operating states and state transition events are shown in FIG. 3, there may be additional operating states and state transition events as one skilled in the art will readily appreciate.

In inactive data service state 302, the mobile device is neither involved in a voice call or a data call. No traffic channel is established for the communication of voice or packet data; in fact, no IP connection and Point-to-Point Protocol (PPP) connection are established either. The mobile device is merely "idle" in state 302 and is awaiting input from the end user or communications from the network. In voice call state 304, the mobile device is involved in a voice call where audible voice signals are communicated over a traffic channel established between the mobile device and the wireless network.

In active data service (connected) state 306, the mobile device is involved in a data call where a traffic channel is established between the mobile device and the wireless network for communicating data therebetween. The communicated data may be, for example, data pertaining to an e-mail message or Internet communications. In active data service (connected) state 306, data are either being actively communicated over the traffic channel or are expected (potentially). Preferably, active data service (connected) state 306 involves the communication of packet data where an IP connection and PPP connection are established between the mobile device and one or more other devices in the network. The mobile device enters into "active" data service once it has established PPP connectivity.

In active data service (dormant) state 308, the mobile device maintains PPP connectivity but no traffic channel between the mobile device and the wireless network is maintained (i.e. no data call is established). In voice call & active data service (dormant) state 310, the mobile device is both engaged in a voice call and an active data service in the dormant state. Audible voice signals are communicated over a traffic channel during the voice call and, although PPP connectivity is maintained for the data communication service, no simultaneous traffic channel exists for the communication of data for the service.

The mobile device may transition from inactive data service state 302 to voice call state 304 by a transition event 320 involving either a receipt of a voice call request from the user interface of the mobile device (e.g. dialing/selection of telephone number) or a voice call request from the wireless network (i.e. a page for voice call). The mobile device may transition from voice call state 304 to inactive data service state 302 by a transition event 322 involving either a receipt of a call disconnect request from the mobile device or the wireless network. The mobile device may transition from inactive data service state 302 to active data service (connected) state 306 by a transition event 324 involving a PPP setup request to receive an IP address for the mobile device. The mobile device may transition from active data service (connected) state 306 to inactive data service state 302 by a transition event 326 involving termination of the PPP connection.

The mobile device may transition from active data service (connected) state 306 to active data service (dormant) state 308 by a transition event 328 involving an expiration of a timer at the mobile device or the wireless network. This timer is initially set to a predetermined time period (e.g. 10 nor 20 seconds) which is reset upon receipt or transmission of data, but will expire if no data is received or transmitted within the predetermined time period. This is known as an "inactivity timeout" which is set by a service provider or an application of the mobile device. The mobile device may transition from active data service (dormant) state 308 to active data service (connected) state 306 by a transition event 330 involving a data communication associated with the software application (receiving/sending e-mail message or Internet data). For example, the end user may draft and send an e-mail message from the mobile device or may receive updated stock quotes from the wireless network. The mobile device may also transition from active data service (dormant) state 308 to inactive data service state 302 by a transition event 336 involving a termination request which is communicated in response to any one of several events, such as a powering down of the mobile device. The mobile device may transition from active data service (dormant) state 308 to voice call & active data service (dormant) state 310 by a transition event 332 involving either the receipt of a voice call request from the user interface of the mobile device (i.e. dialing/selection of telephone number) or a voice call request from the wireless network (i.e. a page for voice call). The mobile device may transition from voice call & active data service (dormant) state 310 to active data service (dormant) state 308 by a transition event 334 involving either the receipt of a call disconnect request from the mobile device or the wireless network.

Traditionally, mobile device operation is limited in that the end user cannot originate a voice call from the user interface when the mobile device is in active data service (connected) state 306. If a voice call is attempted by the end user when the mobile device is in active data service (connected) state 306, the mobile device will not initiate voice call processing. The end user ordinarily has to wait until transition event 328 occurs (i.e. timer expiration) so that the mobile device enters into active data service (dormant) state 308, so that transition event 332 can be made (i.e. placing of the voice call). Similarly, the wireless network cannot traditionally connect an outside voice call request to the mobile device when the mobile device is in active data service (connected) state 306. If a voice call to the mobile device is attempted by a calling party at this time, the network will provide a busy signal to the caller or send the call into voicemail of the mobile device.

However, the mobile device of the present application includes unique state transitioning aspects to alleviate such problems. In particular, a transition event 350 is provided for direct state transitioning from active data service (connected) state 306 to voice call & active data service (dormant) state 310. Transition event 350 involves receipt of a voice call request from the user interface of the mobile device (i.e. dialing/selection of telephone number). It may also be triggered by an incoming call indication from the wireless network. Although depicted as a single transition from active data service (connected) state 306 to voice call & active data service (dormant) state 310, the transition may also be viewed as a two-step transition from active data service (connected) state 306 to active data service (dormant) state 308 to voice call & active data service (dormant) state 310 via a single event.

If a voice call is attempted by the end user when the mobile device is in active data service (connected) state 306, the mobile device will cause the traffic channel of the data service to be torn down to "force" the data service into a dormant state. The mobile device may, for example, transmit a specific release order qualification code to tear down the traffic channel. In IS-2000, there are different qualification codes to indicate the reason for call termination. In the present embodiment, the mobile device indicates that it is terminating the data call in order to enter into a dormant state. Advantageously, this release order does not terminate the PPP connectivity of the data service. Regarding this particular embodiment, connected and dormant active states and release orders are defined in detail in the 3$^{rd}$ Generation (3G) standard of IS-707 and 3G-PP2 C.S0005-0. Subsequently, the mobile device initiates voice call processing to establish the voice call with the mobile device using a new traffic channel. Thus, the end user does not have to wait for transition event 328 to occur (i.e. the timer expiration) before making a voice call.

The wireless network is similarly able to connect a voice call to the mobile device when the mobile device is in active data service (connected) state 306. The wireless network may include one or more servers to execute such a technique. If a voice call is attempted by an outside calling party while the mobile device is in active data service (connected) state 306, the network will cause the traffic channel of state 306 to be torn down to force the data service into a dormant state. The network may, for example, transmit a release order such as that described above) to tear down the traffic channel and force the mobile device into dormancy. Thus, the calling party will not hear the busy signal nor be sent to voicemail of the mobile device, but rather be connected in a voice call with the mobile device.

Optionally, the mobile device may provide state transitioning from voice call & active data service (dormant) state 310 to active data service (connected) state 306 by a transition event 352. Transition event 352 involves either the receipt of a voice call disconnect request from the mobile device or wireless network provided that there is pending data transaction. Alternatively, in response to a call disconnect request while in voice call & active data service (dormant) state 310, the mobile device transitions 334 into active data service (dormant) state 308. In any case, pending data requests which may have been interrupted by the voice call may be immediately resumed or completed after leaving state 310. This also applies to data composed while the voice call was in progress as well as other data transactions.

Figure 4:
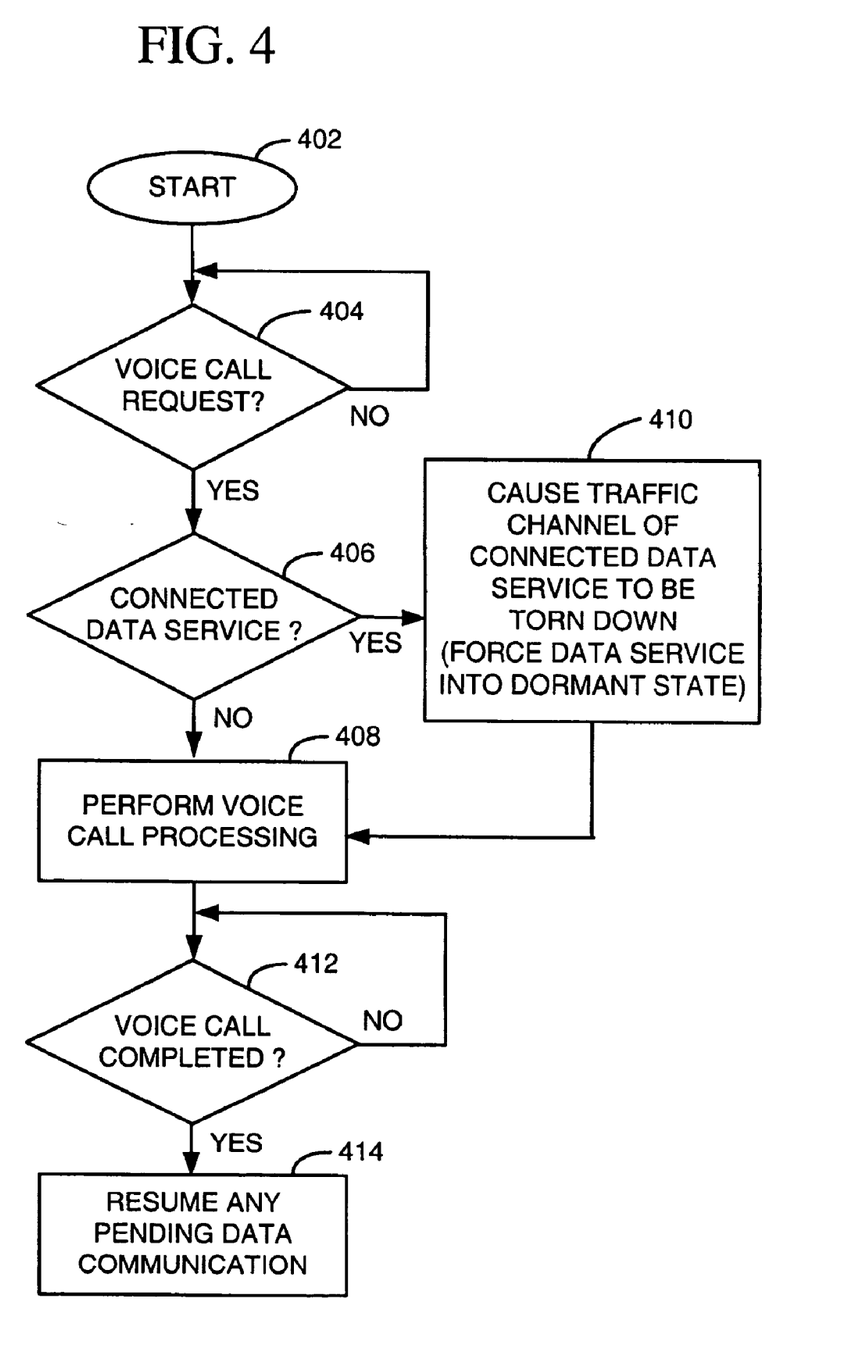
FIG. 4 is a flowchart which describes a method of prioritizing voice call requests during data communication sessions with the mobile communication device.

FIG. 4 is a flowchart which describes a method of prioritizing voice call requests during data communication sessions with a mobile communication device. The method may be performed by a mobile device or a network (one or more servers) as described in relation to FIGS. 1 and 2. A computer program product may include computer instructions stored on a computer storage medium (memory of the mobile device or one or more servers of the network, a floppy disk or CD-ROM) which are written in accordance with the described logic.

In the flowchart of FIG. 4, the mobile device is described as performing the method. The mobile device uses its one or more processors (e.g. its microprocessor) for execution of the method along with its wireless transceiver for wireless communications and control. Beginning at a start block 402 of FIG. 4, the mobile device monitors its user interface to identify whether a voice call request is being received from the end user (step 404). To make a voice call request, the end user typically dials and/or selects a telephone number using the user interface of the mobile device. If the mobile device does not identify such a voice call request, it continues monitoring the user interface for such activity. When the mobile device does identify such a voice call request, it determines whether or not it is engaged in an active connected data service (i.e. a data call) (step 406). During an active connected data service, a traffic channel exists between the mobile device and the wireless network for the communication of user data.

If the mobile device identifies that there is no active connected data service in step 406, then the mobile device performs voice call processing for a voice call as is conventional (step 408). If the mobile device identifies that there is an active connected data service in step 406, then the mobile device immediately causes the traffic channel of the data service to be torn down to force the service into a dormant state (step 410). The mobile device may, for example, transmit an appropriate release order indication to tear down the traffic channel without terminating other data service connectivity (e.g. the PPP connection). Subsequently, the mobile device performs voice call processing to establish the voice call with the mobile device using a new traffic channel (step 408). When the voice call is completed as identified in step 412, the mobile device may resume or complete any pending data communication associated with the data service (step 414). Thus, the end user does not have to wait for an expiration of time before making a voice call.

Final Comments. Methods and apparatus for prioritizing voice call requests during data communication sessions involving a mobile communication device have been described. In one illustrative example, an end user invokes a voice call request though a user interface of the mobile device. If this request is made while the mobile device is engaged in a connected data communication service, the mobile device immediately forces the connected data service into a dormant state. In particular, a release order is transmitted to tear down a traffic channel of the connected data service without disrupting other data service connectivity (e.g. PPP connectivity). Subsequently, a voice call with the mobile device is established using a new traffic channel. When the voice call is completed, data communications for the data service will resume if needed. Advantageously, the mobile device prioritizes voice calls during data communication sessions which may be deemed less time-critical.

A mobile communication device of the present application includes a user interface; one or more processors coupled to the user interface; and a wireless transceiver coupled to the one or more processors. The one or more processors are operative to receive a voice call request through the user interface and, in response, cause a traffic channel of a connected data communication service to be torn down and a voice call to be established with the mobile device with use of the wireless transceiver. A computer program product of the present application includes a computer storage medium as well as computer instructions stored on the computer storage medium. The computer storage medium may be any memory in mobile station 202 or even a floppy disk or CD-ROM, as examples. The computer instructions are executable by a processor (e.g. a microprocessor) to perform the steps of receiving a voice call request during a connected data communication service with a mobile communication device; in response to receiving the voice call request during the connected data service: causing a traffic channel of the connected data service to be torn down; and causing a voice call to be established with the mobile device.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

What is claimed is:

1. A method for use by a mobile communication device in prioritizing voice call requests during data communication sessions, the method comprising:

receiving, through a user interface of the mobile communication device, a voice call request for initiating a voice call from the mobile communication device while the mobile communication device is engaged in a connected data communication service, the connected data communication service involving an existing radio traffic channel established between the mobile communication device and a wireless communication network which is utilized for carrying user data of the connected data communication service;

performing the following acts by the mobile communication device in response to the receiving of the voice call request during the connected data communication service:

sending a release order to the wireless communication network for tearing down the existing radio traffic channel of the connected data communication service; and initiating voice call processing for establishing the voice call from the mobile communication device via the wireless communication network using a new radio traffic channel.

2. The method of claim 1, wherein the act of receiving the voice call request comprises receiving a selected telephone number via the user interface.

3. The method of claim 1, wherein the release order includes a release order qualification code which indicates that the existing radio traffic channel is being terminated to enter into a dormant state.

4. The method of claim 1, further comprising:

wherein the act of receiving the voice call request comprises receiving a selected telephone number via the user interface;

wherein the act of sending the release order from the mobile communication device further causes the connected data communication service to enter into a dormant state; and maintaining the data communication service in the dormant state during the voice call.

5. The method of claim 1, wherein the mobile communication device operates in accordance with code division multiple access (COMA).

6. The method of claim 1, wherein the mobile communication device is operative in accordance with a version of a $3^{rd}$ Generation (3G) communication standard which does not allow the mobile communication device to maintain a voice call and a data call at the same time.

7. The method of claim 1, further comprising:

wherein the act of sending the release order further causes the connected data communication service to enter into a dormant state; and maintaining the data communication service in the dormant state during the voice call.

8. The method of claim 1, further comprising:

automatically resuming data communications of the connected data communication service after receiving a voice call disconnect request for ending the voice call.

9. The method of claim 1, wherein the data communication service involves an Internet Protocol (IP) connection.

10. The method of claim 1, further comprising:

maintaining an Internet Protocol (IP) connection for the data communication service after the existing radio traffic channel is torn down and the voice call is established.

11. The method of claim 1, wherein the data communication service involves a Point-to-Point Protocol (PPP) connection.

12. The method of claim 1, further comprising:

maintaining a Point-to-Point Protocol (PPP) connection of the data communication service after the existing radio traffic channel is torn down and the voice call is established.

13. The method of claim 1, wherein the data communication service comprises e-mail message communication.

14. The method of claim 1, wherein the data communication service comprises Internet data communication.

15. A mobile communication device, comprising:

a user interface;

one or more processors coupled to the user interface;

a wireless transceiver coupled to the one or more processors and adapted to communicate via a wireless communication network;

the one or more processors being further operative to:
- operate the wireless transceiver for the communication of user data for a connected data communication service of the mobile communication device, the connected data communication service involving an existing radio traffic channel established between the mobile communication device and the wireless communication network which is utilized for carrying the user data;
- receive, through the user interface during the connected data communication service, a voice call request for initiating a voice call from the mobile communication device;
- in response to the receiving of the voice call request during the connected data communication service:
  - send, via the wireless transceiver, a release order to the wireless communication network for tearing down the existing radio traffic channel of the connected data communication service; and
  - initiate voice call processing for establishing, via the wireless communication network, the voice call from the mobile communication device with use of the wireless transceiver using a new radio traffic channel.

16. The mobile communication device of claim 15, which operates in accordance with code division multiple access (CDMA).

17. The mobile communication device of claim 15, wherein the release order further causes the connected data communication service to enter into a dormant state.

18. The mobile communication device of claim 15, wherein the release order further causes the connected data communication service to enter into a dormant state which is maintained during the voice call.

19. The mobile communication device of claim 15 wherein the one or more processors are further operative to automatically resume data communications of the connected data communication service in response to a voice call disconnect request for ending the voice call.

20. The mobile communication device of claim 15, wherein the tearing down of the existing radio traffic channel prevents further communication of user data for the connected data communication service during the voice call.

21. The mobile communication device of claim 15 wherein the one or more processors are further operative to maintain an Internet Protocol (IP) connection for the data communication service after the existing radio traffic channel is torn down and the voice call is established.

22. The mobile communication device of claim 15, wherein the data communication service involves a Point-to-Point Protocol (PPP) connection.

23. The mobile communication device of claim 15 which is operative in accordance with a version of a 3$^{rd}$ Generation (3G) communication standard which does not allow the mobile communication device to maintain a voice call and a data call at the same time.

24. The mobile communication device of claim 15 wherein the data communication service involves e-mail message communication.

25. The mobile communication device of claim 15 wherein the data communication service involves Internet data communication.

26. A non-transitory computer program product; comprising:
- a non-transitory computer storage medium;
- computer instructions stored on the non-transitory computer storage medium;
- the computer instructions being executable on a processor of a mobile communication device for:
  - receiving, via a user interface of the mobile communication device, a voice call request for initiating a voice call from the mobile communication device while the mobile communication device is engaged in a connected data communication service, the connected data communication service involving an existing radio traffic channel established between the mobile communication device and a wireless communication network which is utilized for carrying user data of the connected data communication service;
  - in response to the receiving of the voice call request during the connected data communication service:
    - sending a release order to the wireless communication network for tearing down the existing radio traffic channel of the connected data communication service; and
    - initiating voice call processing for establishing the voice call from the mobile communication device via the wireless communication network using a new radio traffic channel.

27. The non-transitory computer program product of claim 26, wherein receiving the voice call request comprises receiving a selected telephone number via the user interface.

28. The non-transitory computer program product of claim 26, wherein the release order includes a release order qualification code which indicates that the radio traffic channel is being terminated to enter into a dormant state.

29. The non-transitory computer program product of claim 26, wherein the mobile communication device operates in accordance with code division multiple access (CDMA).

30. The non-transitory computer program product of claim 26, wherein the computer instructions are further executable for causing the connected data communication service to enter into a dormant state when the radio traffic channel is torn down.

31. The non-transitory computer program product of claim 26 wherein the computer instructions are further executable for resuming data communications of the data communication service after ending of the voice call.

32. The non-transitory computer program product of claim 26, wherein the computer instructions are further executable for maintaining an Internet Protocol (IP) connection of the data communication service after the existing radio traffic channel is torn down and the voice call is established.

33. The non-transitory computer program product of claim 26, wherein the computer instructions are further executable for maintaining a Point-to-Point Protocol (PPP) connection of the data communication service after causing the existing radio traffic channel is torn down and the voice call is established.

* * * * *